R. Cook,
Wood Auger.
No. 2,513. Reissued Mar. 19, 1867.
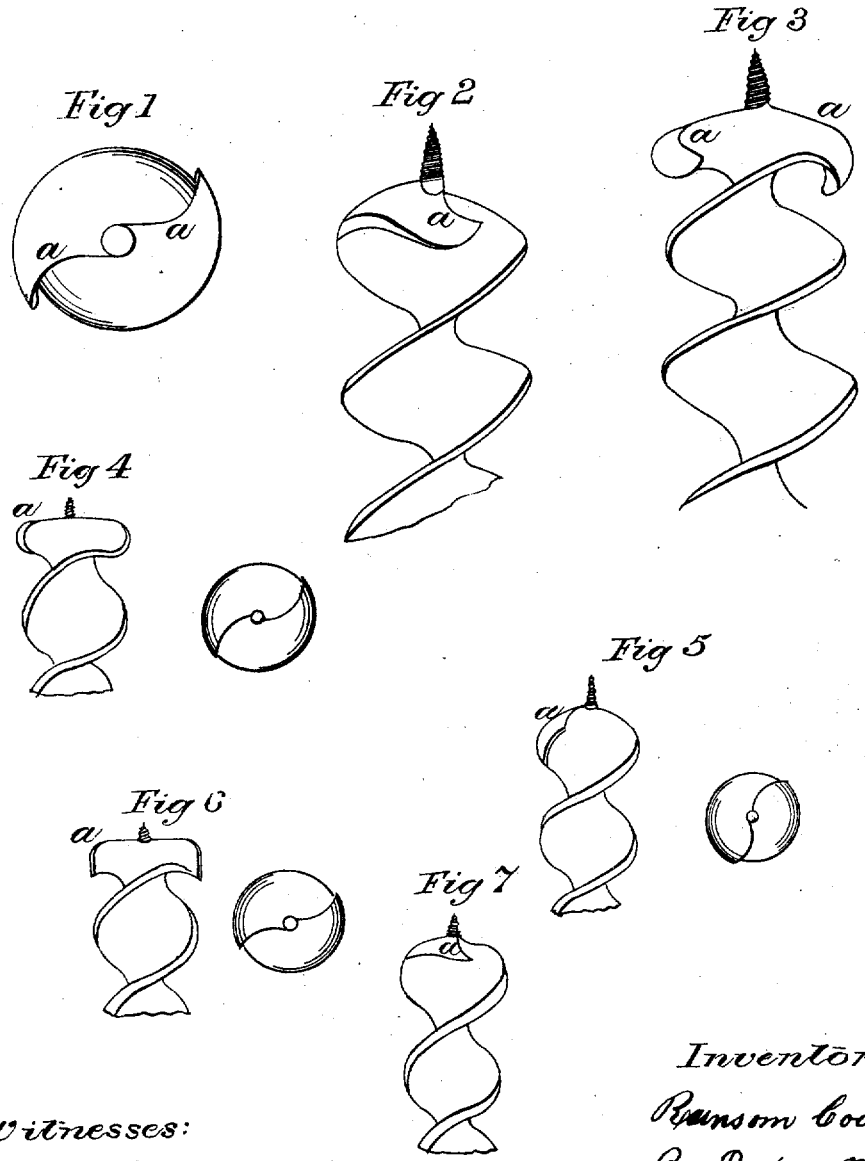
Witnesses:
Geo I. Bergen
John B Laskie
Inventor:
Ransom Cook.
By Dodge & Munn
his Attorneys
AM. PHOTO-LITHO. CO. N.Y. (OSBORNE'S PROCESS)

United States Patent Office.

RANSOM COOK, OF SARATOGA SPRINGS, NEW YORK.

*Letters Patent No.* 8,162, *dated June* 17, 1851; *extended seven years; reissue No.* 2,513, *dated March* 19, 1867.

IMPROVEMENT IN AUGERS.

The Schedule referred to in these Letters Patent and making part of the same.

TO ALL WHOM IT MAY CONCERN:

Be it known that I, RANSOM COOK, of Saratoga Springs, in the county of Saratoga, and State of New York, have invented a new and useful improvement in Boring Implements; and I do hereby declare the following to be a full and exact description thereof, reference being had to the accompanying drawings, making part of this specification, and to the letters of reference marked thereon.

Figure 1 is an end view of an auger made on my improved plan.

Figure 2 is a side view of the same.

Figure 3, a similar view, taken at right angles to fig. 2.

Figures 4, 5, 6, and 7, side elevations, representing slight modifications in the shape of the cutting lips.

My invention consists in so curving or shaping the cutting lips of boring implements as to make the cut diagonally across the grain of the wood, both vertically and horizontally, for the purpose of making the cut both smoother and easier than with the boring implements as heretofore constructed.

To enable others skilled in the art to construct and use my invention, I will proceed to describe it.

I first proceed to forge the blank for the tool, by any of the usual methods, it being most readily accomplished by the use of dies, suitably constructed for that purpose. In drawing or forging the blanks for twist augers made on my plan, the lips should project radially from the centre somewhat further than is customary in making augers with right-angled lips, and they should also project longitudinally or downwards from the handle, at their outer edges, in the form of a swallow's tail, with the spur or point for forming the screw at the centre. After the blank is thus prepared the lips are bent or curved upwards, as shown in figs. 2, 3, 4, and 7, so as to produce a curved or gouge-shaped cutting lip, the curve commencing at the screw and increasing gradually to the extreme point of the lip, as represented in figs. 2, 3, 5, and 7, or commencing some distance from the screw and extending thence to the extremity of the lip, as shown in figs. 4 and 6. By this method of curving the cutting edge *a* of the lips in the vertical plane, they are made to cut diagonally of the grain of the wood, as illustrated by fig. 3, where the horizontal lines represent the grain of the timber, with the auger cutting a hole at right angles to the grain, as is usually the case. While the cutting edges *a* of the lips are thus curved in the vertical plane, they are also curved in the horizontal plane, as represented in figs. 1, 2, 5, and 7. In all these figures except fig. 5, the lips are so curved as to project forward as they recede from the centre outwards, as more clearly shown in fig. 1. By this curving of the lips on the horizontal plane their cutting edges are made to cut diagonally across the grain of the wood in that plane also, and thus there is given to the cutting edges of the lips a compound curve, by which the cutting edge is made to assume a spiral form, as may be seen by examining figs. 2, 3, and 7. While this is the form of lip that I prefer, it is obvious that the form may be varied or modified without departing from the principle of my invention. In fig. 5 the lips are shown sloping or inclined backward instead of forward, and in figs. 4 and 6 the curve of the lip in the vertical plane is shown slightly altered, but the principle in all these forms is the same.

With a boring tool thus constructed it will be seen that in whatever direction it may be made to enter the wood in boring a hole, still the edge of the lip will always cut diagonally across the grain, and that consequently the cut will be easier made and the hole more smooth when finished. With a tool constructed on my plan a hole can be bored into the end of a stick in line with the grain, or diagonally across the grain, with almost as much facility, accuracy, and ease as when boring into the side of a board or stick in the ordinary manner.

It will of course be understood that this form of cutting lips may be applied to twist bits and augers of all styles of twist, and also to centre-bits, the gist of the invention being in the construction of the lip, so as to cause it to cut diagonally across the grain in the act of boring. Figs. 1, 2, 3, and 7 represent the special form or style of lip that I deem best, and which I consider as embodying my invention more fully and perfectly than do the remaining figures, yet in some cases it may be desirable to use the modified forms represented in figs. 4, 5, and 6, and still other modifications may be used without departing from the principle of my invention.

Having thus described my invention, what I claim is—

1. Constructing boring implements with their lips or cutting edges as shown and described, that is, such lips commencing at the screw or point, and extending therefrom nearly at right angles until about half way from the centre to the outer point, and then curving upwards and forwards, said curve being continued until the outer portion of the lip is nearly semicircular, or until it turns within the periphery of the tool.

2. I claim a boring implement having its lips so formed as their cutting edges shall form a spiral line from the point where they begin to curve to their outer extremity, whether the curved edge shall incline forward or backward, substantially as shown and described.

3. I claim a boring implement having its lips or cutting edges curved, both in the horizontal and vertical planes, substantially as herein shown and described.

RANSOM COOK.

Witnesses:
MILES T. COOK,
M. A. LOOMIS.